United States Patent [19]

Grosser

[11] 4,103,513
[45] Aug. 1, 1978

[54] CONSTANT VELOCITY UNIVERSAL JOINT

[76] Inventor: Christian E. Grosser, 214 Sleepy Hollow Rd., Richmond, Va. 23229

[21] Appl. No.: 785,315

[22] Filed: Apr. 6, 1977

[51] Int. Cl.² .............................................. F16D 3/30
[52] U.S. Cl. ........................................ 64/21; 64/9 R
[58] Field of Search ................ 64/21, 8, 9; 74/417 X, 74/437, 435, 380, 381, 459.5

[56] References Cited

U.S. PATENT DOCUMENTS

| | | | |
|---|---|---|---|
| 1,142,051 | 6/1915 | O'Connor | 74/437 |
| 1,626,270 | 4/1927 | Craun | 64/21 |
| 2,584,648 | 2/1952 | Welsh | 64/21 |
| 2,819,597 | 1/1958 | Wildhaber | 64/21 |
| 3,036,446 | 5/1962 | Morgenstern | 64/21 |
| 3,260,070 | 7/1966 | Preston | 64/21 |
| 3,961,497 | 6/1976 | Cohen | 64/21 |

FOREIGN PATENT DOCUMENTS

| | | | |
|---|---|---|---|
| 997,928 | 1/1952 | France | 64/21 |
| 694,747 | 6/1940 | Fed. Rep. of Germany | 64/21 |
| 930,056 | 7/1955 | Fed. Rep. of Germany | 64/21 |

Primary Examiner—Benjamin W. Wyche
Assistant Examiner—R. C. Turner
Attorney, Agent, or Firm—Kane, Dalsimer, Kane, Sullivan and Kurucz

[57] ABSTRACT

A rolling-contact universal joint rotatably transmits power from one shaft to another without variations in velocity, at relatively large angles of deflection between input and output shafts. A cluster of gear segments capable of transmitting comparatively high torques over a wide range of speeds are interposed between interdigitated forks. The relative motions between the load carrying elements are rolling contacts between gear segments; and the conical shape of cooperating gear surfaces affords opportunity for adjustments to eliminate backlash in the assembly or to take up wear.

29 Claims, 16 Drawing Figures

CONSTANT VELOCITY UNIVERSAL JOINT

BACKGROUND OF THE INVENTION

In wide use and possessing various designs in power transmission machinery is the universal joint (sometimes termed knuckle joint) which has been long existant in the art of machine building. In its earliest and simplest forms such is familiarly known as the Hooke's or Cardan type, consisting essentially of two forks connected through an intermediate block straddled by the forks and journalled thereto at right angles to each other. The Hooke's-Carden type of joint has the virtue of simplicity combined with capability of accommodating high torques at very large angles of deflection between input and output shafts. However, the dynamic performance is not ideal, since there is a variation between the angular motions of the connected shafts, which has unacceptably severe inertial load consequences at: high speeds, large deflection angles, or with substantial masses connected by the cooperating shafts. Elementary analysis shows that the angular variation characteristic of the Hooke's or Cardan joint is described by the relationship $$\tan \alpha = \tan \beta \sec \Delta,$$

where $\alpha$ and $\beta$ are the angles of rotation of the input and output shafts and $\Delta$ is the deflection angle between the shafts. A typical value of the variation is seen at $\Delta = 36°$ which is at the upper limit reached in most high speed applications such as automatic front wheel drives, axles and transmission shafts. At this deflection the output shaft will alternately be angularly advanced or retarded, each twice per shaft revolution, to peak values of $\pm 6°$. The corresponding variation in velocity is $\pm 24\%$ referred to the input speed.

It is clear that such variations in relative position would be awkward in precision control applications where it is important to maintain accuracy of motion from one point in a machine drive to another point via a universal joint used to change shaft direction. The substantially large cyclical variations in velocity create intolerable vibrations and acceleration loads where massive loads are being driven.

Despite the undesirable characteristic of nonuniformity in the Hooke's or Cardan joint, its simplicity has led to extensive application where speeds and inertial loads are low and demands for precision of position are minimal. But increasing areas of application are developing where the consequences of motion irregularity are unacceptable for reasons of noise, excessive vibration, imprecision of control, or consequent wear. Numerous examples can be cited such as the automotive front wheel drives, helicopter rotor drives, marine inboard-outboard propellor shafts, hydraulic pump swash plate drives, etc.

Beginning with the era of abruptly higher machine and transportation speeds circa the end of World War I, intensive efforts were made to find substitutes (for the Hooke's-Cardan type of joint) which would have uniform velocity performance. A small number of successful joints have been found, notably the Rzeppa and Weiss rolling ball joints, and a variety of sliding block types of which the Tracta appears to be the most frequently used. In addition a number of "kinematic" models have appeared which are theoretical laboratory solutions of the problem of providing constant velocity angular transmission. However, regarding the latter, their practical value is questionable for reasons of complexity, non-compactness, or low-load carrying ability.

A fairly frequent solution is the use of two Hooke's-Cardan joints in series, so phased that the irregularities of one are cancelled out by oppositely directed variations of the other. This is less than ideal because of: the added space required by the second joint, the irregular motion of the intermediate member between the two, inability in many applications to ensure that each joint operates at the same angle as the other; as well as other obvious disadvantages such as cost, noise vibration and wear to mention a few.

The rolling ball joints invented almost 50 years ago have enjoyed the greatest success and are used currently as first choice where high performance is required. However, they have limitations in respect to high manufacturing cost, limited durability, and are subject to derating at high speeds and large deflection angles. They are not susceptible of adjustment to take up wear and therefore cannot be assembled to a true zero backlash condition (in view of manufacturing tolerances) without preloading which detracts from load carrying ability and economy of production.

It may therefore be fairly said that much room for improvement remains in the evolution of the universal joint regarding economy, simplicity, durability and other factors.

SUMMARY OF THE INVENTION

An object of the present invention is to provide a universal joint which eliminates the aforementioned disadvantages and drawbacks of prior art joints and which is capable of being mass produced economically, employing reasonable manufacturing tolerances to achieve precise uniform velocity operation.

Another object is to provide a constant velocity universal joint of the foregoing type which is not only simple but capable of being produced at relatively low cost compared to existing constant velocity universal joints while being competitive with non-uniform velocity joints of the Hooke's-Cardan types in general use.

Still another object is to provide a universal joint of the foregoing type which may be manufactured to existing standards of gear tooth or cam profiles and by the use of current gear or cam production tools in manufacturing practices.

A further object is to provide a universal joint of the foregoing type which is capable of being designed to accept torque loadings equal to or exceeding existing constant velocity universal joints with equivalent size proportions and speed ratings equal to or exceeding existing types as well as a joint capable of operating at deflection angles equal to or greater than existing types.

A still further object is to provide a constant velocity universal joint which is adjustable as to operating clearance for the accommodation of generous manufacturing tolerances to achieve minimum backlash in the original assembly and which is adjustable during the useful operating life to take up wear and thereby minimize backlash throughout the term of use, which feature is not available in existing types.

DETAILED DESCRIPTION

Figure 1:
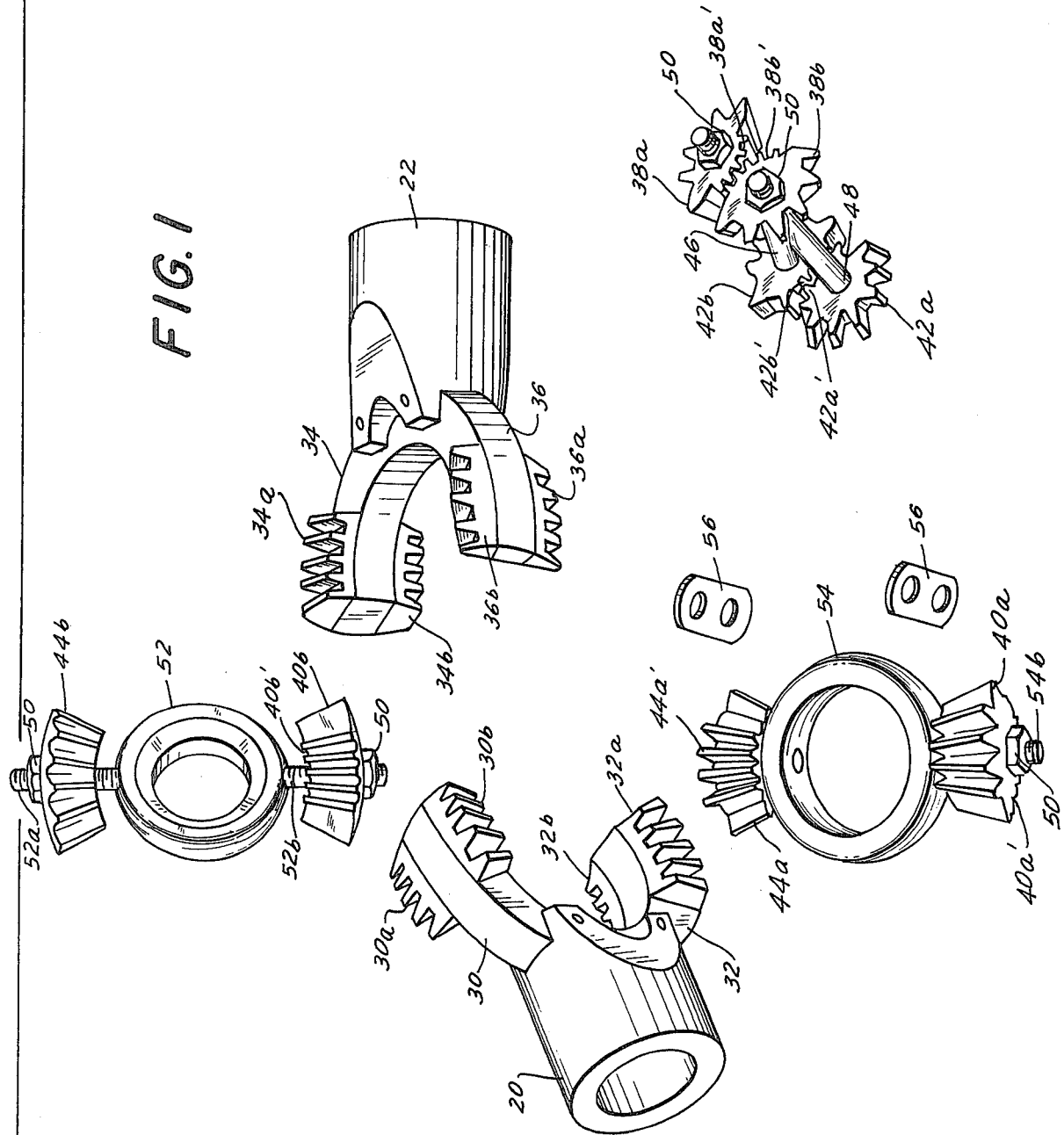
FIG. 1 is an exploded isometric view of the constant velocity universal joint of this invention.

In the drawings, the joint main input and output members are two massive keyed drive hubs 20 and 22 to receive the respective input and output shafts 24 and 26 which are to be connected by the universal joint 28. These hubs have extending therefrom forks 30, 32, 34 and 36 which transmit torque in either direction of rotation to the associated bevel gear segments 30a and 30b, 32a and 32b, 34a and 34b, and 36a and 36b, respectively. Where desired or necessary, the hubs and associated forks with segments may be integral with each other, that is to say they may be machined out of one solid blank and thereby eliminate the need for fasteners. In the drawings, these parts are shown as separate elements in the accompanying illustrations only to isolate their individual functions.

The bevel gear segments 30a, 30b, 32a, 32b, 34a, 34b, 36a and 36b may be considered to be segments of a complete circular bevel gear so situated that the axis of rotation of the teeth of a given segment is a line through the center of the joint, but at 45° with the plane of the fork on which the segment is located. Each bevel gear segment may be regarded as a "slice" of its parent gear cut out on a plane at 45° to the gear axis. The origins of the bevel gear segments and their essential orientation are illustrated in FIGS. 13 to 16.

Figure 11:
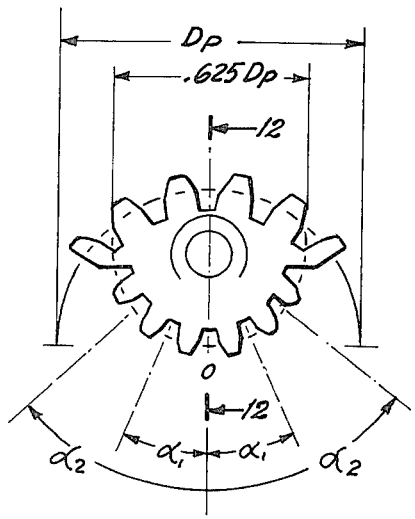
FIG. 11 is an elevational view of a "rocking" pinion segment.
Figure 12:
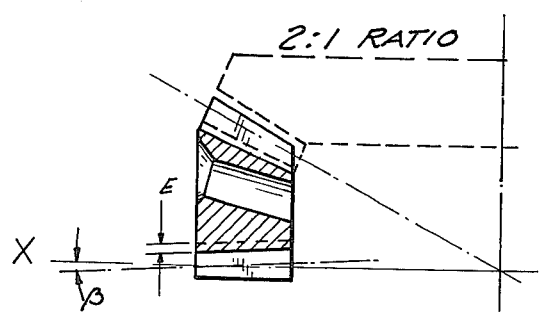
FIG. 12 is a cross-sectional view taken along lines 12—12 of FIG. 11.

Bevel split compound pinion segments 38a and 38b, 40a and 40b, 42a and 42b, and 44a and 44b are portions of standard involute bevel pinions as mating members with the bevel gear segments of a standard bevel reduction gear set which in the illustrated embodiment has a tooth ratio of 2:1. It should be understood that this invention contemplates utilization of ratios. The split pinion segments are as divided at the exact center of the parent pinion (see FIG. 15) and then the split surfaces are formed into the toothed contours 38a', 38b', 40a', 40b', 42a', 42b', 44a' and 44b', respectively. These contours are derived from a cylindrical spur pinion form or blank which is revised by a slight tooth modification accomplished by supplementary gear cutting of the spur gear tooth spaces to greater depth E and at slight angle β to the spur gear blank axis, as a function of the angle α taken around the pitch circle from the center element designated as 0—0. The extra depth cutting produces pitch contours which depart slightly from a circular form and may be described generically as paraboloid. The paraboloid pitch colours have magnitudes proportional in size to the distance from the joint center in the same way as the bevel pinion teeth are proportioned in size from the center. The extra depth E and angle β are as tabulated in the following table with reference to FIGS. 11 and 12, as modifications to a spur pinion blank which has a pitch diameter of 0.625 as large as the pitch diameter of the large end of the associated bevel pinion; and the angle β is taken inwardly in the same sense as the angle of the pitch cone of the bevel pinion teeth. Obviously, the described modifications leading to the spur gear configuration will be different for other than the tooth ratio of the illustrated embodiment.

| E *     | α       | β       |
|---------|---------|---------|
| + .0005 |         | + .10   |
| − .0000 |         | − .00   |
| inches  | degrees | degrees |
| 0.0028  | 12      | 0.301   |
| 0.0100  | 24      | 0.970   |
| 0.0168  | 36      | 1.678   |
| 0.0186  | 48      | 2.328   |
| 0.0133  | 60      | 2.953   |

* Applicable directly to $C_p$ or circular pitch = $\pi/16$ for bevel gear and pinion teeth. For larger values of $C_p$ decrease E proportionately to the pitch $C_p$. α and β are unchanged.

Figure 4:
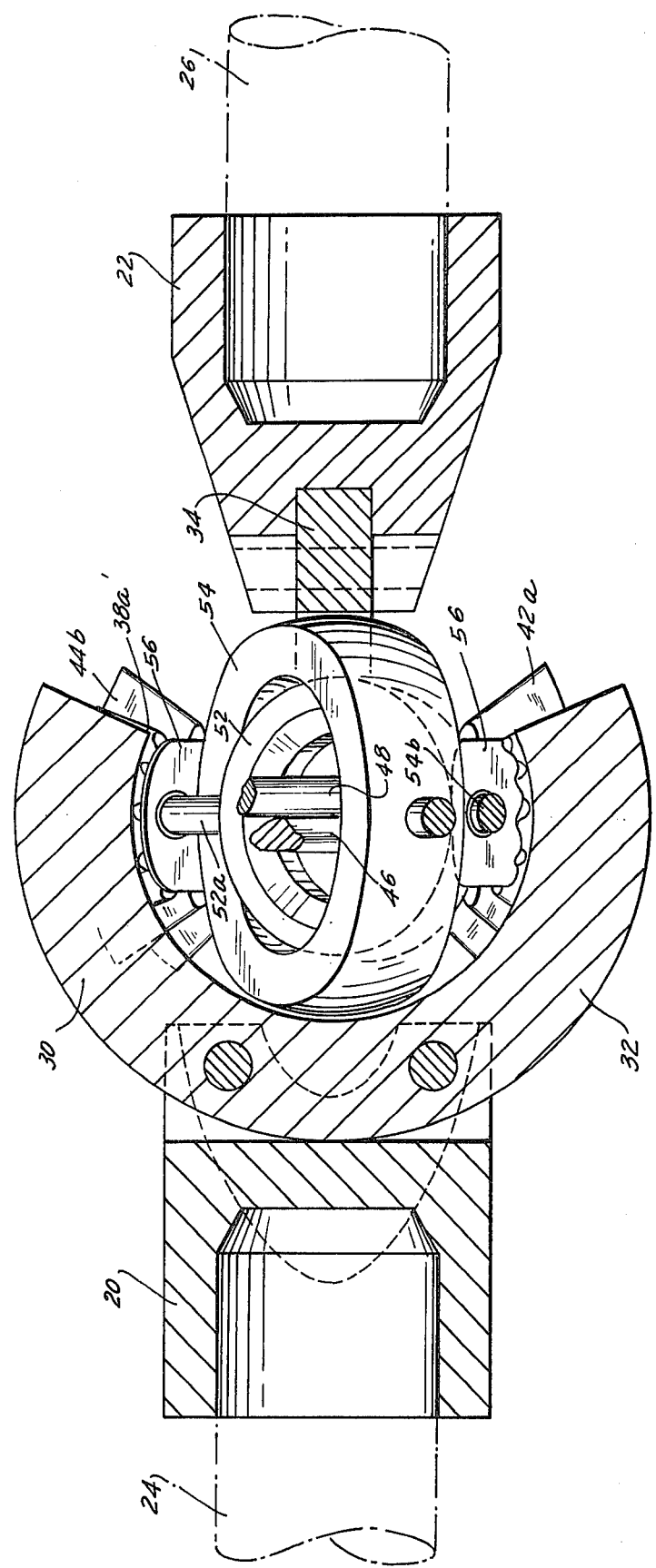
FIG. 4 is a sectional view taken along lines 4-4 of FIG. 3.
Figure 5:
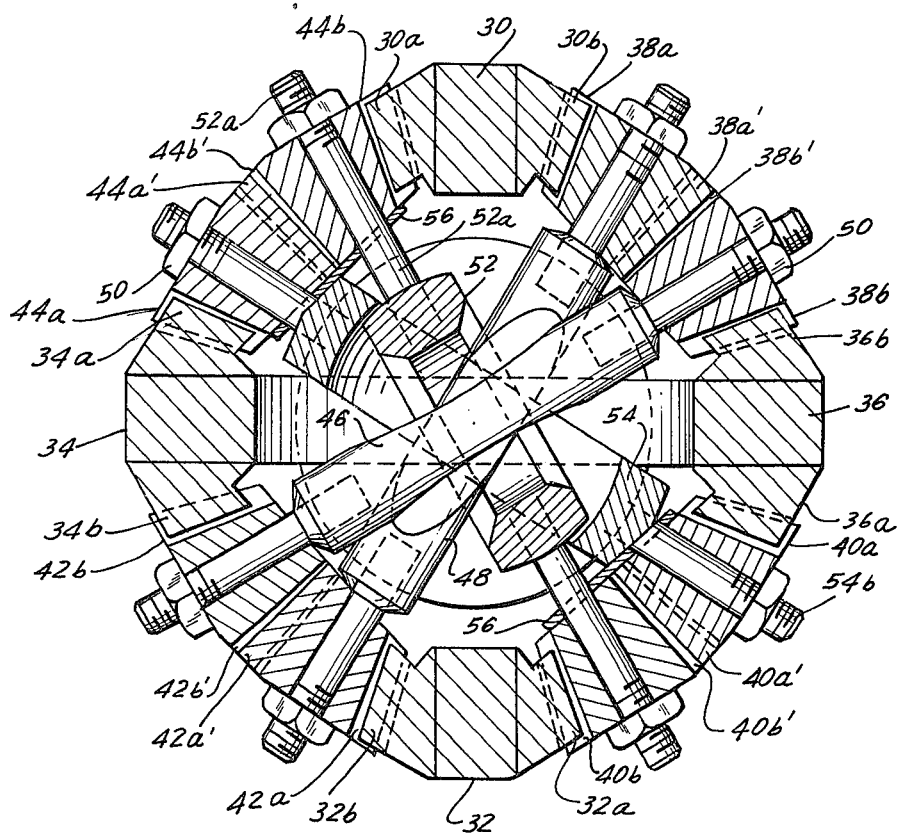
FIG. 5 is a sectional view taken along lines 5-5 of FIG. 3.
Figure 6:
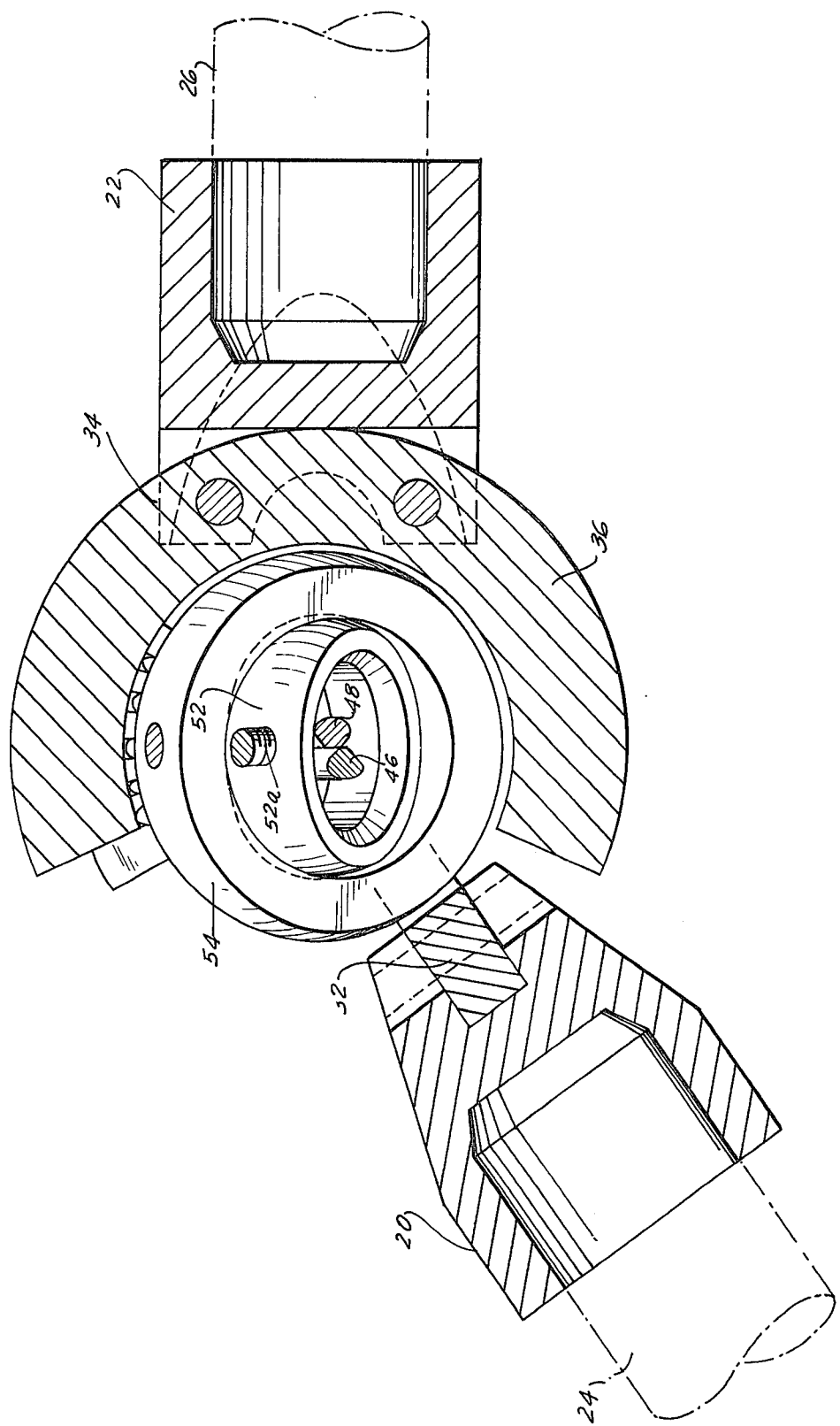
FIG. 6 is a sectional view taken on the common central plane containing the two shaft axes and parallel to the plane of the drawing.
Figure 7:
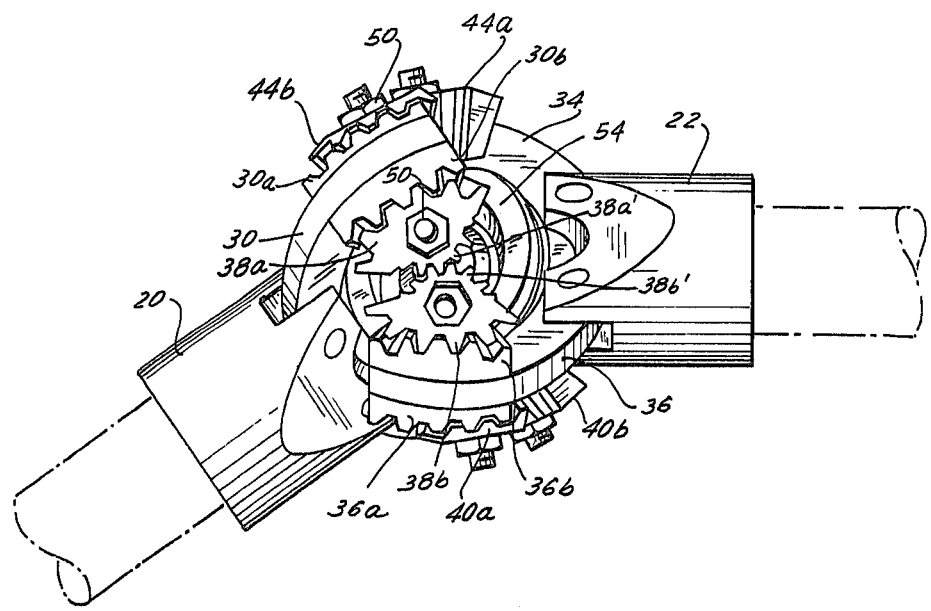
FIG. 7 is a view similar to FIG. 3 but with the joint rotated 45°.

Tension rods 46 and 48 have threaded ends and in association with screw studs 14 and nuts 50 serve to tie together pairs of pinion segments which are diametrically opposite (and which have been found to describe theoretically identical motions in all aspects of the joint action). The two rods 46 and 48 are trimmed near the center of their length in such a way as to permit them to cross at about 30° in the common plane which contains their longitudinal axes. The trimming also provides for them to turn relative to each other about their axes so that the "rocking" motion of the compound pinion segments 38a–42b is unimpeded. The radially outward thrust forces which are an inevitable consequence of force on the bevel pinion teeth, are balanced by the tension rods. The tension rods 46 and 48 are associated with only two pairs of the compound split bevel pinion segments 38b and 42b, and 38a and 42a. respectively. The other two bevel pinion pairs are accommodated by two rings 52 and 54, which fit together as shown in FIG. 4 each having opposed radially extending threaded studs 52a and 52b and 54a and 54b and associated nuts 50. The tension between diametrically opposite bevel pinion segments is assumed in each ring through these screw studs and nuts. The relationships among the interlocking tension members is shown more comprehensively in FIG. 5.

The stabilizing links 56 serve to keep aligned those bevel pinion segments 40b and 44b attached to the smaller tension ring 52. These two gear segments have no other inner abutment against inward displacement except the taper of the teeth. It has been found that in dynamic operation, tooth friction forces may cause progressive inward creeping to cause jamming in the absence of a positive stop against such a tendency.

Obviously, other alternative means may be adopted for positioning the bevel pinion segments in fixed relationship with each other. Suitable key arrangements (not shown) may be employed and shims (not shown) may be deployed so that the bevel pinion segments may be exactly positioned inwardly for optimum gear operating clearance (backlash) to minimize tooth friction and permit adequate film thickness for lubricant. Such shims provide opportunity for initial fitting of the assembly in view of manufacturing tolerances. The shims also allow take-up for wear in the course of extended operation to provide essentially ideal fitting and minimized "backlash" conditions throughout a long useful life.

Thus, a combination (cluster) of gears transmit torque by means of tangential pressure contacts carried around as near as possible to the outer periphery of the cluster where the load carrying surfaces have the greatest mechanical advantage; and to establish contours for the gear pitch surfaces which will provide for their intimate contact in all relative positions of the input and output members in rotation and deflection. The compound bevel split pinions 38a, 38b, 42a and 42b act as idlers between the bevel gear segments 30b, 36b, and 32b, 34b to transmit (by pressure through them) the torque forces from one fork to the other. The compound pinion segments 38a, 38b, 42a and 42b may rock on each other in such a way that the space between opposing forks is always exactly filled when said opposing forks assume a relative angular attitude to each other (as opposed to a mutually parallel relationship). As will be appreciated, the necessary condition for constant velocity transmission is simply that the input and output shafts must not turn with respect to the axis of deflection (and therefor with each other) as shafts are deflected from a straight line through the joint center.

Figure 13:
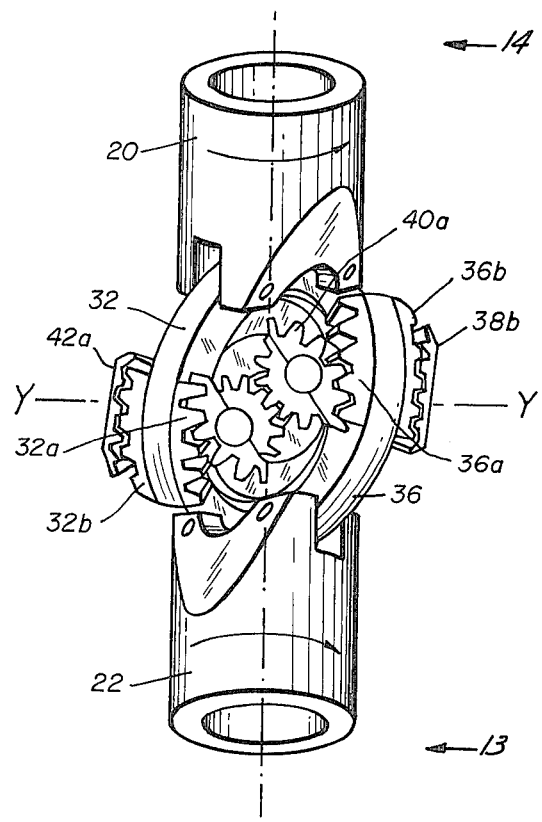
FIG. 13 is a diagrammatic view of the universal joint of this invention showing each of the drive and driven shafts deflected Δ/2° about axis Y—Y upwardly from the plane of the drawings with the included angle being 180° − Δ with the forks oriented 45° to the plane of the drawings.
Figure 14:
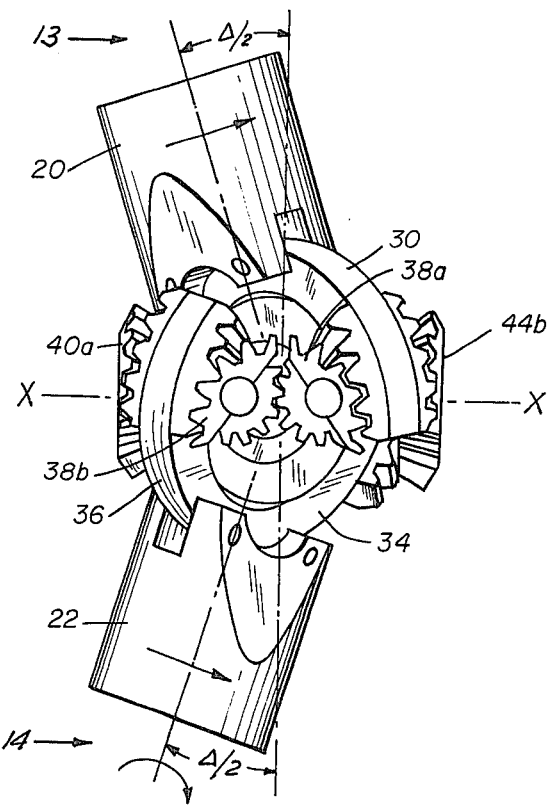
FIG. 14 is a side elevational view of the universal joint of FIG. 13.
Figure 15:
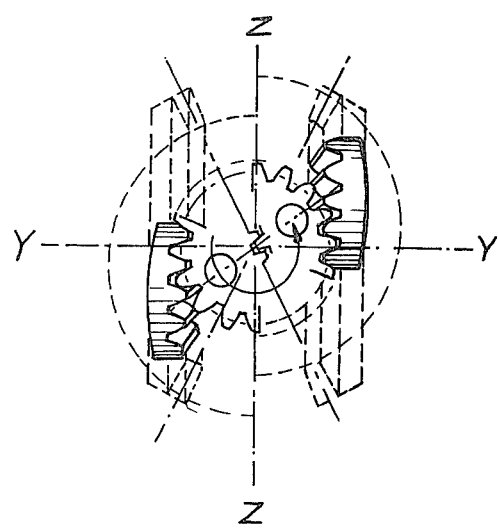
FIG. 15 is another diagrammatic view of the gear segments shown in FIG. 13 illustrating the rotation of the pinion segments as a unit about axes X—X and the bevel gear segments as part of complete bevel gears shown in phantom with their rotation being about axes Y—Y.
Figure 16:
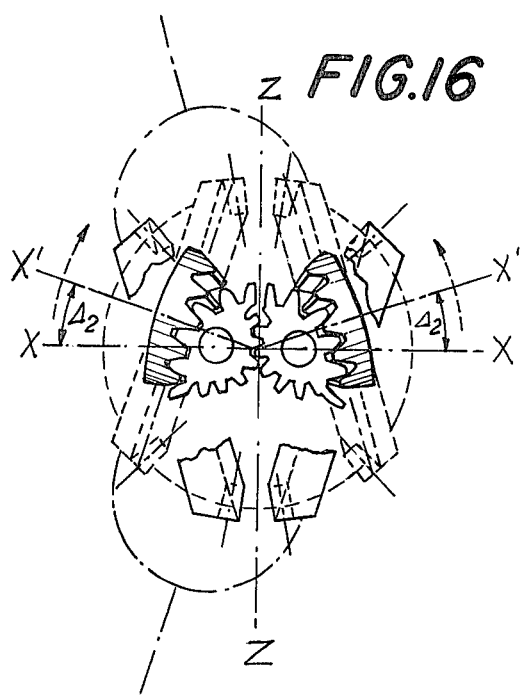
FIG. 16 is a similar diagrammatic view showing the movement of the pinion segments and the bevel gear segments shown in detail in FIG. 14 with axis X'—X' being perpendicular to the rotational axes of the drive and therefore the new positions of the rotational axes of the bevel gears shown in phantom from which the gear segments of FIG. 14 are derived.

An examination of FIGS. 13-16 will serve to make clear that for the condition of shaft rotation where the shaft forks are each oriented at 45° to the axis of deflection (in this case the axis about which the deflection takes place is the YY axis) a total joint deflection angle of Δ as shown in FIG. 14 causes the bevel gear segments to take an angular attitude to each other and forces the associated split pinion segments to rock, and roll down in the figure moving into that unique position where they just fill the space between the gear segments. The spur gear pitch surface is so shaped that regardless of the angle taken by the gear segments there is only one position that it can take, since any other position would not allow enough room. In other words, the associated split pinion segments roll into a "hollow" and stay there. It should be noted that the same behavior is exhibited by the matching split pinion segments diametrically opposite (beneath the plane of the drawing).

The corresponding behavior of those elements 90° removed are shown in FIG. 13. Here the fork-mounted bevel gear segments perform a pure rotation about the axis of deflection Y—Y, in opposite directions to each other. The associated split pinion segments act in this mode as though it were solid or unsplit and simply rotates on its axis X—X, through an angle equal to Δ/2 multiplied by the gear-to-pinion ratio (which in this case is 2).

It should be obvious that under the total deflection Δ the rotation of the split pinion segments as a unit (no rocking necessary since the opposing gears are parallel) the input and output shafts do not rotate about their own axes (they simply swing about Y—Y as a pivot). Therefore under the conditions described above for the relationships in FIGS. 13 and 14, the necessary condition for constant velocity is satisfied. It can be shown that any other position of the joint (deflection about X—X creates the same conditions as for that about Y—Y) creates a condition which is a vector combination of FIGS. 13 and 14. For example if the shafts are deflected by Δ about a new 45° axis W—W, half-way between X and Y, the same effect can be obtained by first deflecting 0.707 Δ about Y—Y, then 0.707 Δ0 about X—X. The resulting final position is the same and all the split pinion segments have performed two functions as shown individually in FIGS. 13 and 14 but superimposed upon each in combination. The action for the component of deflection about YY is identical to that of FIG. 14 AA (except to a lesser degree) and the component of deflection about X—X is 0.707 of that shown in FIG. 13. This latter is pure rotation of the associated split pinion segments. This supplementary rotation of the pinion is not quite ideal since it has been rocked into a slightly non-circular form by the other component of the deflection. However, it has been found mathematically that in the case of 36° total deflection Δ the worst consequence is the introduction of one thousandth of the joint's outside radius as looseness during the rotation. Such degree of looseness is negligible as a practical consideration in view of necessary operating clearances.

Figure 2:
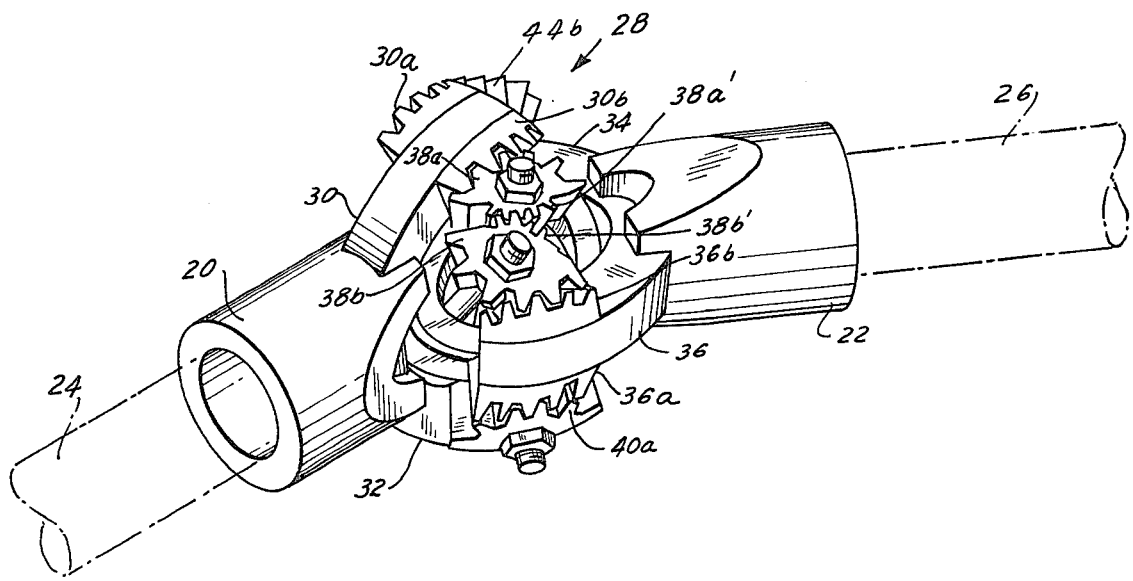
FIG. 2 is an isometric view of the universal joint in assembled form showing the drive and driven axis at an angle relative to one another.
Figure 3:
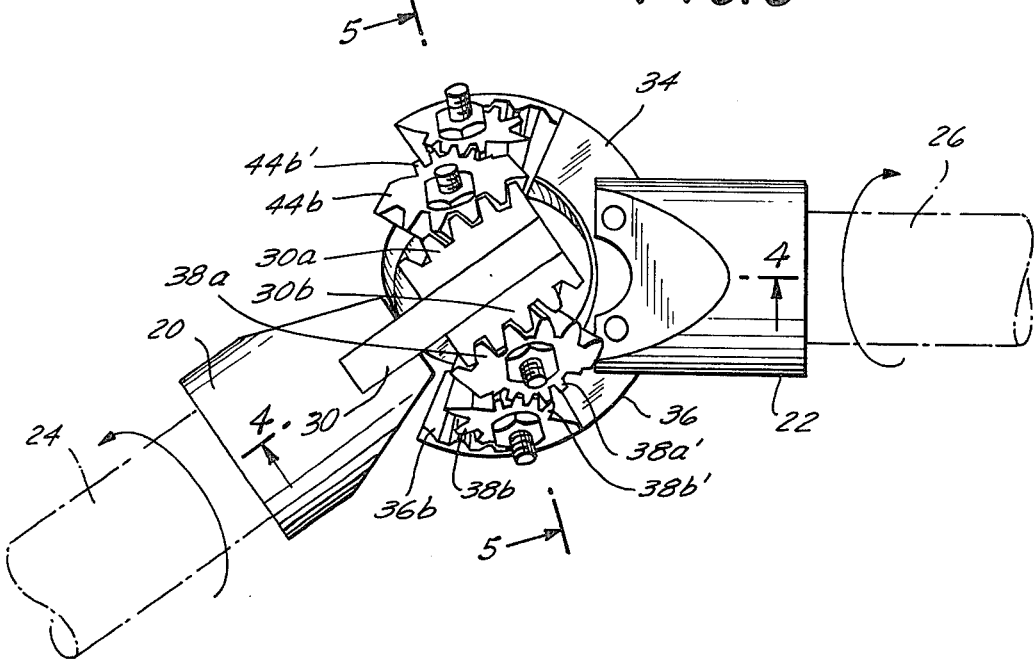
FIG. 3 is a top plan view of the assembled universal joint of FIG. 2.
Figure 8:
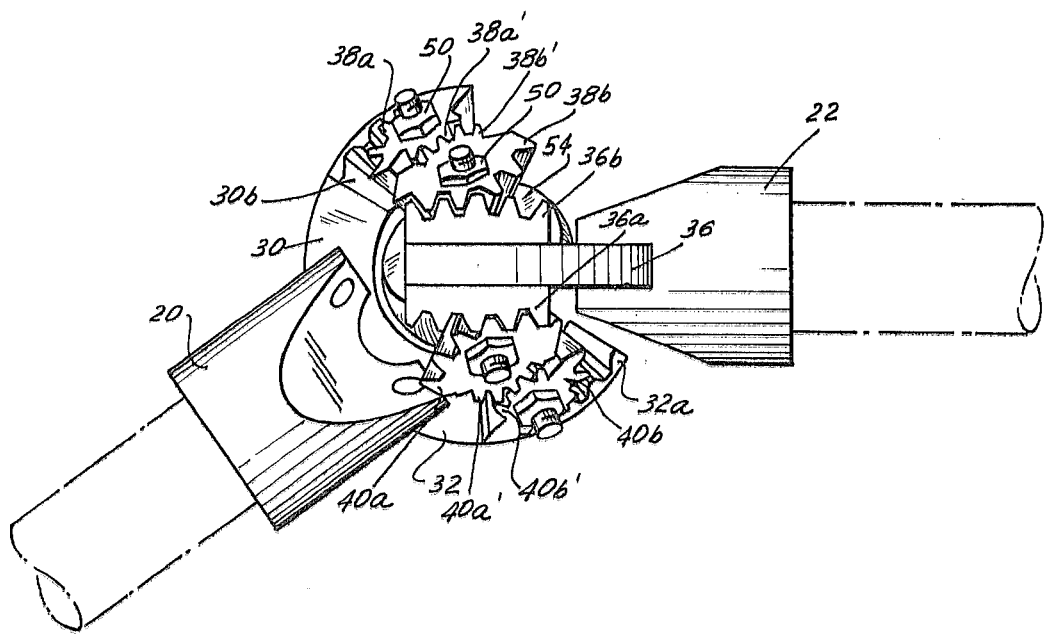
FIG. 8 is a view similar to FIG. 3 but with the joint rotated 90°.
Figure 9:
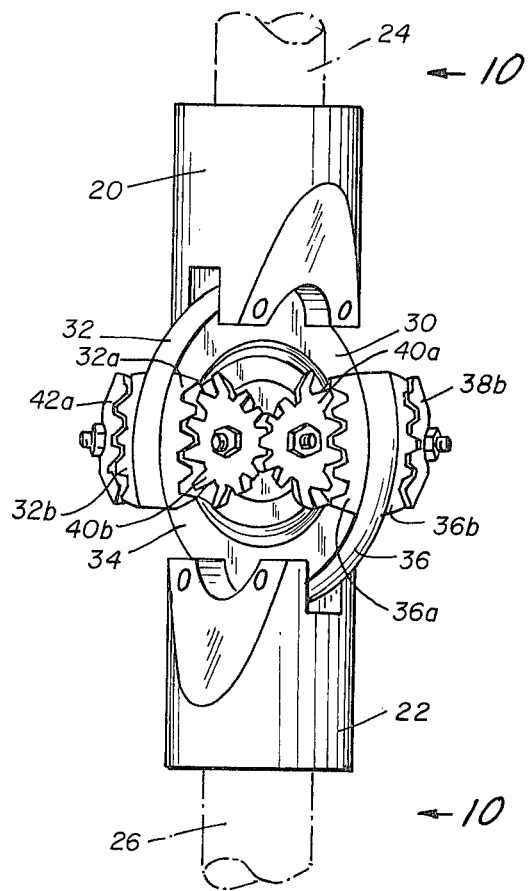
FIG. 9 is a top plan view of the universal joint with the axes of the drive and driven shafts aligned with the forks orientated 45% to the plane of the drawing.
Figure 10:
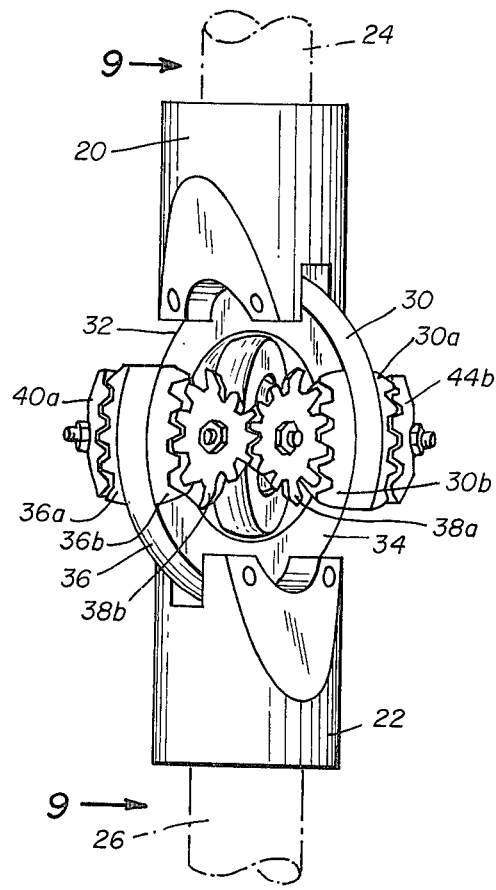
FIG. 10 is a side elevational view of the universal joint shown in FIG. 9.

One complete revolution of the universal joint 28 will now be described with reference to the drawings. Assuming a relative disposition of the drive shaft 24 and driven shaft 26 turned 45° from their respective disposition illustrated in FIG. 3, the pinion segment 38a and 38b will be engaged as shown in FIG. 14. Pinion segments 42a and 42b on the opposite side (hidden) will be rocked to the same degree but in the opposite direction. Pinion segments 40a and 40b (and 44a and 44b on the opposite side and hidden) will be disposed as shown in FIG. 13. Turning the shafts 90° in a clockwise direction from FIGS. 13 and 14 will reverse the disposition of pinion segments from that illustrated in FIGS. 13 and 14. Towards this end, pinion segments 38a and 38b together with 42a and 42b will be disposed in the manner depicted by 40a, 40b and 44a and 44b in FIG. 13. Pinion segments 40a and 40b will then be disposed as are 38a and 38b shown in FIG. 14 with pinion segments 44a and 44b rocked in the same manner but in the opposite direction. Upon further rotation of the shafts through another 90° or 225° from FIG. 3, pinion segments 42a and 42b will be disposed in the manner depicted by 38a and 38b in FIG. 14 with pinion segments 38a and 38b then becoming hidden, rocked to the same degree but in the opposite direction. Pinion segments 40a and 40b and 44a and 44b will again be disposed substantially as they are shown in FIG. 13, but with their locations reversed. When the shafts are turned another 90° (or 315° from FIG. 3) pinion segments 44a and 44b will be disposed substantially as 38a and 38b are shown in FIG. 14 with pinion segments 40a and 40b then hidden below rocked to the same extent but in the opposite direction. At 315° from FIG. 3 pinion segments 38a and 38b and 42a and 42b will be disposed substantially as 40a and 40b are shown in FIG. 13. At 45° intervals from the positions shown in FIGS. 13 and 14 the pinion segments will assume positions that would be a combination of rocking and turning substantially as shown in FIGS. 2, 3 and 8.

In the preferred embodiment of the invention shown in the drawings, the rolling contact surfaces are toothed. However, in a somewhat less preferred embodiment, the same result can be obtained by substituting curved cam contact surfaces which duplicate the pitch surface contours of the illustrated gears and pinions supplemented by "crossed-belt" metal strips interposed between the contacting rolling surfaces and so fastened as to prevent slippage.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A constant velocity universal joint for rotatably transmitting power from one shaft to another without substantial variations in velocity at relatively large angles of deflection between shafts without substantial backlash comprising:

drive shaft coupling means for coupling the joint with a drive shaft;

driven shaft coupling means for coupling the joint with a driven shaft;

a first pair of bifurcated forks extending from the drive shaft coupling means and including a first fork and a second fork each having spaced-free ends;

a second pair of bifurcated forks extending from the driven shaft coupling means and being interposed between and in space relationship with the first fork pair, the second fork pair including a third fork and a fourth fork each having spaced-free ends;

each fork having opposed side faces;

gear segment torque transmitting means interposed between and coupling the opposed side faces of the adjacent forks while filling the space therebetween when the shafts are disposed at an angle relative to one another and the drive shaft is rotated and the driven shaft is rotated by the universal joint, the gear segment means including a gear segment on each side face at the fork-free end, the gear segment means including a pinion segment meshed with each gear segment; and split interengagement means being provided for interengaging each pair of pinion segments between the first and fourth fork, fourth and second fork, second and third fork, and third and first fork whereby the pinion segments will rock back and forth relative to the associated meshed gear segment through the associated interengagement means when the shafts are disposed at an angle relative to one another and the drive shaft is rotated and the driven shaft is rotated by the universal joint.

2. The invention in accordance with claim 1 wherein each gear segment is beveled.

3. The invention in accordance with claim 1 wherein each pinion segment is beveled.

4. A constant velocity universal joint for rotatably transmitting power from one shaft to another without substantial variations in velocity at relatively large angles of deflection between shafts without substantial backlash comprising:

drive shaft coupling means for coupling the joint with a drive shaft;

driven shaft coupling means for coupling the joint with a driven shaft;

a first pair of bifurcated forks extending from the drive shaft coupling means and including a first fork and a second fork each having spaced-free ends;

a second pair of bifurcated forks extending from the driven shaft coupling means and being interposed between and in space relationship with the first fork pair, the second fork pair including a third fork and a fourth fork each having spaced-free ends;

each fork having opposed side faces;

gear segment torque transmitting means interposed between and coupling the opposed side faces of the adjacent forks while filling the space therebetween when the shafts are disposed at an angle relative to one another and the drive shaft is rotated and the driven shaft is rotated by the universal joint, the gear segment means including a gear segment on each side face at the fork-free end, each gear segment being beveled, the gear segment means including a pinion segment meshed with each gear segment, each pinion segment being beveled; and interengagement means being provided for interengaging each pair of pinion segments between the first and fourth fork, fourth and second fork, second and third fork, and third and first fork whereby the pinion segments will rock back and forth relative to the associated meshed gear segment through the associated interengagement means when the shafts are disposed at an angle relative to one another and the drive shaft is rotated and the driven shaft is rotated by the universal joint, the interengagement means including meshed spur-gear segments, with each spur-gear extending from and associated with a pinion segment.

5. The invention in accordance with claim 4 wherein each pinion segment and its extending spur-gear segment is diametrically opposed from another pinion segment with extending spur-gear segment and each of the pair of diametrically opposed pinion segments with extending spur-gear segments being connected to counteract outward thrust applied thereto during rotation of said shafts.

6. The invention in accordance with claim 5 wherein the connection of diametrically opposed pinion segments with extending spur-gear segments is by a tension means which balances the opposing radial outward thrust imposed on the pinion segments when under torque load without essentially any relative radial movement of the pinion segments thereby eliminating the need for thrust bearings.

7. A constant velocity universal joint for rotatably transmitting power from one shaft to another without substantial variations in velocity at relatively large angles of deflection between shafts without substantial backlash comprising:
  drive shaft coupling means for coupling the joint with a drive shaft;
  driven shaft coupling means for coupling the joint with a driven shaft;
  a first pair of bifurcated forks extending from the drive shaft coupling means and including a first fork and a second fork each having spaced-free ends;
  a second pair of bifurcated forks extending from the driven shaft coupling means and being interposed between and in space relationship with the first fork pair, the second fork pair including a third fork and a fourth fork each having spaced-free ends;
  each fork having opposed side faces; and
  gear segment torque transmitting means interposed between and coupling the opposed side faces of the adjacent forks while filling the space therebetween when the shafts are disposed at an angle relative to one another and the drive shaft is rotated and the driven shaft is rotated by the universal joint, the gear segment means including a plurality of segments each having interengagement means for interengaging a pair of segments adjacent forks.

8. The invention in accordance with claim 7 wherein each segment is diametrically opposed from another segment and each of the pair of diametrically opposed segments being connected to counteract outward thrust applied thereto during rotation of said shafts.

9. The invention in accordance with claim 8 wherein the connection of diametrically opposed segments is by a tension means which balances the opposing radial outward thrust imposed on the segments when under torque load without essentially any relative radial movement of the segments thereby eliminating the need for thrust bearings.

10. A constant velocity universal joint for rotatably transmitting power from one shaft to another without substantial variations in velocity at relatively large angles of deflection between shafts without substantial backlash comprising;
  drive shaft coupling means for coupling the joint with a drive shaft;
  driven shaft coupling means for coupling the joint with a driven shaft;
  a first pair of bifurcated forks extending from the drive shaft coupling means, and including a first fork and a second fork each having spaced free ends;
  a second pair of bifurcated forks extending from the driven shaft coupling means and being interposed between and in spaced relationship with the first fork pair, the second fork pair including a third fork and a fourth fork each having spaced free ends;
  each fork having opposed side faces and a gear segment on each side face at the fork free end;
  a pinion segment meshed with each gear segment;
  split interengagement means for interengaging each pair of pinion segments between the first and fourth fork, fourth and second fork, second and third fork, and third and first fork whereby the pinion segment rocked back and forth relative to the associated meshed gear segment through the associated interengagement means when the shafts are disposed at an angle relative to one another, and the drive shaft is rotated and the driven shaft is rotated by the universal joint.

11. The invention in accordance with claim 10 wherein the gear segment includes bevel gear teeth.

12. The invention in accordance with claim 10 wherein the pinion segment includes bevel gear teeth.

13. The invention in accordance with claim 10 wherein the interengagement means includes meshed spur-gear segments, with each spur-gear segment extending from and associated with a pinion segment.

14. The invention in accordance with claim 13 wherein each pinion segment and its extending spur-gear segment is diametrically opposed from another pinion segment with extending spur-gear segment and each of the pair of diametrically opposed pinion segments with extending spur-gear segments being connected to counteract outward thrust applied thereto during rotation of said shafts.

15. The invention in accordance with claim 14 wherein the connection of diametrically opposed pinion segments with extending spur-gear segments is by a tension means which balances the opposing radial outward imposed on the pinion segments when under torque load without essentially any relative radial movement of the pinion segments thereby eliminating the need for thrust bearings.

16. A constant velocity universal joint for rotatably transmitting power from one shaft to another comprising gear segments support means comprising at least two opposed unconnected side faces, a gear segment on each side face, a pinion segment meshed with each gear segment, split interengagement means for interengaging each pair of pinion segments between the opposed side faces, and whereby the pinion segments are adapted to rock back and forth relative to the associated meshed gear segment through the associated interengagement means when the shafts are disposed at an angle relative to one another.

17. The invention in accordance with claim 16 wherein there are four pairs of the opposed side faces and a corresponding number of pairs of each of the segments.

18. The invention in accordance with claim 17 wherein the gear segment includes bevel gear teeth.

19. The invention in accordance with claim 17 wherein the pinion segment includes bevel gear teeth.

20. The invention in accordance with claim 17 wherein the interengagement means includes meshed spur-gear segments, with each spur-gear segment extending from and associated with a pinion segment.

21. The invention in accordance with claim 20 wherein each pinion segment and its extending spur-gear segment is diametrically opposed from another pinion segment with extending spur-gear segment and each of the pair of diametrically opposed pinion segments with extending spur-gear segments being connected to counteract outward thrust applied thereto during rotation of said shafts.

22. The invention in accordance with claim 21 wherein the connection of diametrically opposed pinion segments with extending spur-gear segments is by a tension means which balances the opposing radial outward thrust imposed on the pinion segments when under torque load without essentially any relative radial movement of the pinion segments thereby eliminating the need for thrust bearings.

23. The invention in accordance with claim 21 wherein adjustment means are provided for relocating the radial position of the pinion segments to take up wear resulting from operation of the universal joint.

24. A constant velocity universal joint for rotatably transmitting power from one shaft to another comprising gear segments support means comprising at least two opposed unconnected side faces, a gear segment on each side face, a pinion segment meshed with each gear segment, interengagement means for interengaging each pair of pinion segments between the opposed side faces, and whereby the pinion segments are adapted to rock back and forth relative to the associated meshed gear segment through the associated interengagement means when the shafts are disposed at an angle relative to one another and a cluster of gears interposed between said side faces to transmit torque by means of tangential pressure contacts carried around as near as possible to the outer periphery of the cluster where the load carrying surfaces have the greatest mechanical advantage.

25. The invention in accordance with claim 24 wherein the gear-pitch surfaces are so constructed, contoured and arranged to provide for their intimate contact in all relative positions of the input and output members in rotation and deflection.

26. The constant velocity universal joint for rotatably transmitting power from one shaft to another comprising in-put and out-put shaft forks, beveled gear segments mounted on the forks, beveled split pinions having associated pressure carrying means acting as idlers between the bevel gear segments for transmitting by pressure through them the torque forces from one fork to another during rotation of the shafts.

27. The invention in accordance with claim 26, wherein the beveled pinions are split in half along their axes and the split surfaces are shaped as spur gear segments defining the pressure carrying means so that the two halves of the pinion are capable of rocking on each other in such a way that the space between opposing forks is always exactly filled when said opposing forks assume a relative angular attitude to each other.

28. The invention in accordance with claim 26 wherein adjustment means are provided for relocating the radial position of the pinion tooth segments to take up where resulting from operation of the universal joint.

29. The invention in accordance with claim 27 wherein the forks and gear segments cooperate in defining a spherical envelope, the segments presenting conical gear surfaces that terminate at a common center which is in the center of the sphere and the intersection between the two shaft axes which center is the origin of all of the axes about which the joint deflects.

* * * * *